(12) United States Patent
Tesavis et al.

(10) Patent No.: US 9,906,664 B2
(45) Date of Patent: Feb. 27, 2018

(54) MOBILE AUTONOMOUS SCALABLE SCANNER SYSTEM

(71) Applicant: KODAK ALARIS INC., Rochester, NY (US)

(72) Inventors: Carl Tesavis, Rochester, NY (US); Jude SanGregory, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 14/984,234

(22) Filed: Dec. 30, 2015

(65) Prior Publication Data
US 2017/0195501 A1 Jul. 6, 2017

(51) Int. Cl.
*H04N 1/04* (2006.01)
*H04N 1/00* (2006.01)
*H04N 1/12* (2006.01)
*G06F 3/12* (2006.01)

(52) U.S. Cl.
CPC ......... *H04N 1/0057* (2013.01); *G06F 3/1203* (2013.01); *G06F 3/1211* (2013.01); *H04N 1/00334* (2013.01); *H04N 1/00339* (2013.01); *H04N 1/00342* (2013.01); *H04N 1/121* (2013.01)

(58) Field of Classification Search
CPC ............ H04N 1/0057; H04N 1/00339; H04N 1/00342; H04N 1/121; G06F 3/1203; G06F 3/1211
USPC ................................ 358/498, 496, 474, 468
See application file for complete search history.

(56) References Cited

U.S. PATENT DOCUMENTS

| | | | | |
|---|---|---|---|---|
| 3,958,106 A | * | 5/1976 | Bedford | B66C 13/40 212/325 |
| 4,489,729 A | * | 12/1984 | Sorenson | A61B 8/00 600/447 |
| 4,816,864 A | * | 3/1989 | Tanaka | G03G 15/50 399/81 |
| 4,852,869 A | * | 8/1989 | Watanabe | A47J 36/36 271/126 |
| 5,168,377 A | | 12/1992 | Nagano | |
| 5,377,022 A | * | 12/1994 | Street | H04N 1/00567 250/208.1 |

(Continued)

FOREIGN PATENT DOCUMENTS

| CN | 204009953 U | 12/2014 |
|---|---|---|
| WO | 2007/012802 | 2/2007 |

OTHER PUBLICATIONS

TS Tech Solutions LLC, Project Gado: Our Technology, http://projectgado.org/our-technology/, publication date unknown.
(Continued)

*Primary Examiner* — Cheukfan Lee
(74) *Attorney, Agent, or Firm* — Hogan Lovells US LLP

(57) ABSTRACT

This invention is directed to autonomous document scanning operations. A scanning device and one or more stacks of documents may use motors to autonomously move the documents into position to be scanned by the scanner. The scanning device may detect properties of the documents while scanning. Multiple stacks of documents may be scanned in this manner with minimal user intervention, eliminating the need for manual intervention when scanning groups of documents.

18 Claims, 8 Drawing Sheets

(56) References Cited

U.S. PATENT DOCUMENTS

| | | | | |
|---|---|---|---|---|
| 5,418,732 | A * | 5/1995 | McFadin | B25J 9/1692 |
| | | | | 414/273 |
| 5,668,630 | A | 9/1997 | Bilodeau et al. | |
| 5,798,841 | A * | 8/1998 | Takahashi | H04N 1/1017 |
| | | | | 358/296 |
| 6,097,566 | A * | 8/2000 | Heller | G11B 15/6835 |
| | | | | 360/92.1 |
| 6,178,344 | B1 * | 1/2001 | Hull | A61B 5/11 |
| | | | | 600/382 |
| 7,465,139 | B2 * | 12/2008 | Diem | B65H 1/20 |
| | | | | 271/10.01 |
| 7,595,915 | B2 | 9/2009 | Belkhir | |
| 7,663,129 | B1 * | 2/2010 | Lu | H01L 21/67265 |
| | | | | 250/223 R |
| 7,724,401 | B2 * | 5/2010 | Sheng | H04N 1/00204 |
| | | | | 358/1.6 |
| 8,025,284 | B2 * | 9/2011 | Ikeuchi | B65H 1/14 |
| | | | | 271/110 |
| 8,025,452 | B2 * | 9/2011 | Hong | B41J 11/58 |
| | | | | 400/624 |
| 8,688,579 | B1 * | 4/2014 | Ethington | G06Q 20/0425 |
| | | | | 705/35 |
| 2005/0179878 | A1 * | 8/2005 | Ohtsuka | A61B 6/4216 |
| | | | | 355/30 |
| 2006/0250662 | A1 * | 11/2006 | Heit | B02C 18/0007 |
| | | | | 358/474 |
| 2006/0290047 | A1 * | 12/2006 | Moore | B65H 3/0676 |
| | | | | 271/10.11 |
| 2008/0137158 | A1 * | 6/2008 | Sawada | H04N 1/00525 |
| | | | | 358/497 |
| 2008/0224391 | A1 * | 9/2008 | Oshima | B65H 1/14 |
| | | | | 271/265.01 |
| 2008/0226371 | A1 * | 9/2008 | Oshima | B65H 1/18 |
| | | | | 399/397 |
| 2009/0021451 | A1 * | 1/2009 | Suto | H04N 1/00533 |
| | | | | 345/30 |
| 2009/0105967 | A1 * | 4/2009 | Hatanaka | G01N 29/0618 |
| | | | | 702/39 |
| 2010/0322373 | A1 | 12/2010 | Churilla | |
| 2012/0268597 | A1 * | 10/2012 | Mizuno | G06Q 50/22 |
| | | | | 348/143 |
| 2013/0010321 | A1 | 1/2013 | Shen | |

OTHER PUBLICATIONS

Notification of Transmittal of the International Search Report and the Written Opinion of the International Searching Authority, International Search Report, and Written Opinion of the International Searching Authority issued in PCT/US16/68896 dated May 8, 2017.

* cited by examiner

MOBILE AUTONOMOUS SCALABLE SCANNER SYSTEM

FIELD OF THE INVENTION

This invention is directed to autonomous document scanning operations, and in particular using one or more autonomous, propelled scanner devices to scan multiple stacks of documents with minimal user intervention.

BACKGROUND OF THE INVENTION

Production document scanning is typically carried out using Automatic Document Feeder (ADF) based scanners with dedicated input and output trays, as shown in FIG. 1. An ADF scanner typically employs a stacked sheet separator mechanism which is generally a torque limited retard roller 102 and/or frictional pad which applies an opposing force to selectively separate the top sheet intended to be imaged from the remainder of a stack of documents to be separated and imaged sequentially top-down. Typically there is an elevator mechanism 103 which raise the tray supporting the input stack of documents 101 from which the separator mechanism removes the top sheet. This elevator maintains the optimal separation geometry between the document stack and the separation mechanism. The separated documents are transported by friction nip rollers past CCD line capture imagers, and the information on each sheet of the two sided document is rendered as a typical digital image file (JPEG, TIFF etc.) processed to have a good visual appearance and optimized for post processing like Optical Character Recognition (OCR). The imaged documents are deposited in an output tray 104 where they are manually removed by a dedicated human operator 105. Typically a dedicated operator is required to run this type of device, with one operator per machine.

The typical prior art scanning operation employs a number of traditional ADF scanners 9 (as described in FIG. 1) and is depicted in FIG. 2. A user may wish to scan unsorted documents 201. Human input 205 may be used 202 to sort document stacks into sorted document stacks 203-204. The documents may be manually transported 207 to document scanners 209 and 210 where manual intervention 208 is required to scan the documents. Documents are then manually transported 211 for archive 212 or disposal 213. Manual operators 214 may examine digital images of scanned documents to determine whether a rescan is necessary. If no rescan is necessary, the digital images are stored as customer data 215.

As more capacity is required in traditional scanning operations, more scanners are added with additional operators 8. Scaling the operation as it grows is expensive, and therefore is employed until a higher capacity scanner is available. In a large scanning operation, there would be many scanner-operator pairs 10. The scanners used in these traditional scanning operations are typically large and expensive, and require additional and expensive personnel, referred to as Doc Prep operators 5, to prepare the documents for scanning.

There are typically 2-4 Doc Prep operators 5 required to maintain an adequate flow of documents for a 200-250 page per minute scanner. Unorganized documents 1 are manipulated 2 by the Doc Prep personnel 5 with the main output of their efforts 3, 4 being batches of documents in a format that can be handled efficiently by the scanner operator and fed reliably through the document scanning equipment 8, 9. This manipulation includes removing document sheets from containers (boxes, envelopes and folders), removing binding means (staples, paper clips etc.), flattening wrinkled or folded pages, classifying for optimal scanning settings (color imaging, grayscale imaging, black and white imaging, and image capture resolution), organizing as batches to maintain resultant data as adjacent records, and limiting the stack size to the number of sheets which can be handled by the scanners input elevator.

Document preparation steps vary by scanner operation and also depend on end customer requirements. Upon completion of a document preparation operation, the individual document sheets making up a prepared batch have their lead edges, the initial edge that enters the scanner separation mechanism 102, aligned. This aligned edge is perpendicular to the direction of transport of the separated sheets as they move through the scanner. Each document sheet in a batch must have a center line which is perpendicular to the lead edge, and aligned with the center line of the scanner separation mechanism 102. This alignment allows batches of documents of varying sizes to be reliably separated, transported and imaged. If this were not done, smaller documents intermixed with larger documents would not be separated reliably and may not be transported until the next larger lead edge aligned sheet was separated. This is referred to as a multi feed. The resultant batches as prepared by the Doc Prep personnel are referred to as scanner ready stacks.

When a number of scanner ready stacks are available at a document preparation location they are moved manually from the document preparation area to a scanner area, typically by hand cart, to the input queue of a designated scanner operator. A given scanner operator takes un-scanned prepped documents from the input queue in sequence, places them in the input tray of the document scanner, initiates the scanning. Once scanned, the documents are removed from the output tray by the operator and placed in a scanned document holding location. The digitized images from that scanner ready stack are reviewed by a quality control (QC) operator, which can be the scanner operator but many times is a dedicated QC operator. If it is done by the scanner operator, the scan operation is slowed down and efficiency of the scanning operation is reduced. If there are images in the batch detected as part of QC that require the original to be re scanned, the scanner operator must go find that batch and reprocess it, possibly with more aggressive image processing settings to extract more image data. Once a given number of scanned batches are cleared through the QC process, the scanned documents are transported to either an archive to be stored or, after customer approval, to a certified document destruction operation for final disposal.

What is needed is a system and method to increase the efficiency of large scale scanning operations, while reducing costs and operator intervention.

SUMMARY OF THE INVENTION

The present invention is directed to autonomous document scanners, which may be used individually or in groups to scan stacks of documents. Each autonomous document scanner includes an ADF feeder separator and transport and imaging mechanisms. The autonomous document scanners may not have dedicated input tray, and an output tray is employed. The input, output, feeder separator, transport, and imaging components of the ADF scanning system are referred to herein as a Scan Engine. The Scan Engine includes locomotion elements enabling the Scan Engine to autonomously move to document stacks for scanning. For example, the Scan Engine may scan all documents in a stack, and then move from the previously scanned document stack to the next un-scanned document stack. Multiple Scan Engines may work together, and the process of scanning one stack at a time and moving to the next un-scanned stack is repeated indefinitely without human intervention. Scanning is accomplished by lowering (de-elevating) the Scan Engine down as a document stack is processed, separating each sheet in the stack for individualized scanning using the ADF separation mechanism.

Stacks of documents to be scanned may be supported by an output tray, with a movable bottom allowing a previously scanned stack to be deposited in the same location from which the original stack was scanned. This may be done using the locomotion elements to move the scanner output stack over the input location. The Scan Engines may also output stacks to other desired locations, including keeping each document to be scanned in separate, predetermined areas of a room. The autonomous Scan Engines allow un-scanned document stacks in a room to be processed in an unattended manner, with minimal or no user or operator intervention. This allows for stacks of documents to be scanned at varying rates depending on how many autonomous ADF scanners are working in parallel. As noted above, a single autonomous scanner may be used, or a group of scanners may be programmed to work together to scan stacks of documents in a room.

By minimizing operator intervention, the autonomous scanner devices allow for increased efficiency and reduced costs while providing the ability to scan documents in a desired order and at a desired speed by coordinating one or more autonomous scanners.

DETAILED DESCRIPTION OF THE INVENTION

The autonomous scanner system and method allow for efficient, reliable, and coordinated scanning of document stacks placed on designated document pads, tables, or other surfaces in a room. The autonomous scanners work at an optimal rate, which minimizes system cost and maximizes system reliability. The autonomous scanners digitize each page in the stacks, wirelessly transmit the resultant data to customer or operator processing systems 315, and advance to the next stack. This process continues in an unattended manner as depicted in 301-308 indefinitely, or until all available documents are digitized. Additionally, a central controller may be provided to communicate with the autonomous scanners and modify or update the scanning assignments, allowing document stacks to be added or removed during the scanning process.

Communication between the autonomous scanners and central controller managing the scanning operations may be done through wireless communications, such as WiFi, Bluetooth, IR, or RF signals. By automating the scanning process and using autonomous scanners, the system and method contribute significantly to operational efficiency as operator intervention is required only in the case of a paper jam. This allows a single operator 10 using a computing device, such as a cellular phone, tablet, laptop, or desktop computer, to manage a large number of autonomous scanners, as the jam rate is low and reliability is high.

Figure 1:
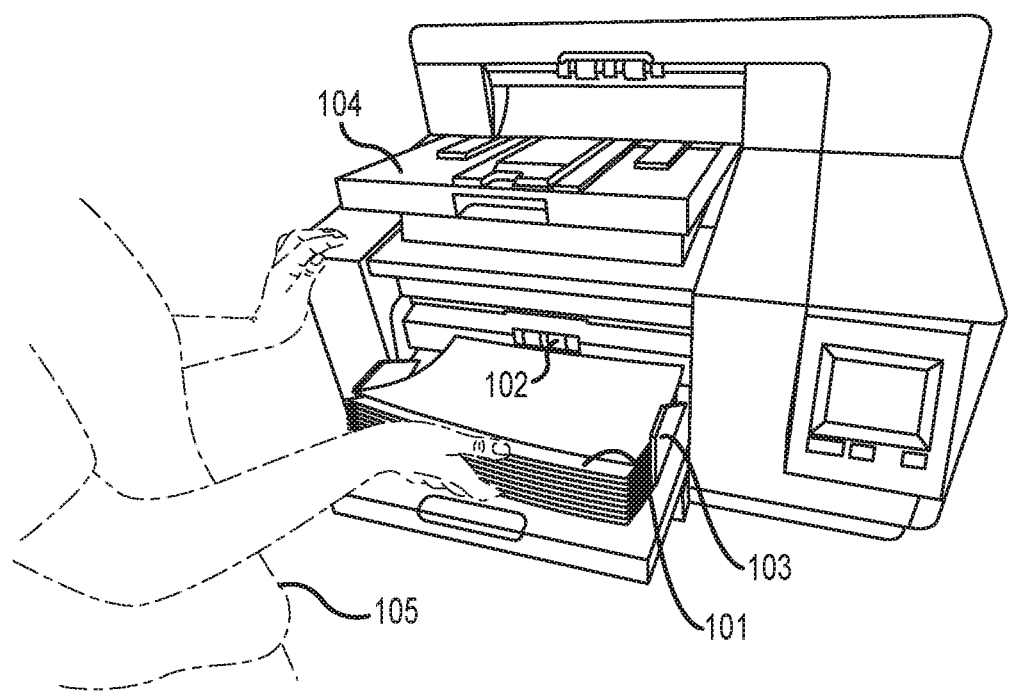
FIG. 1 is a depiction of a prior art scanner.
Figure 2:
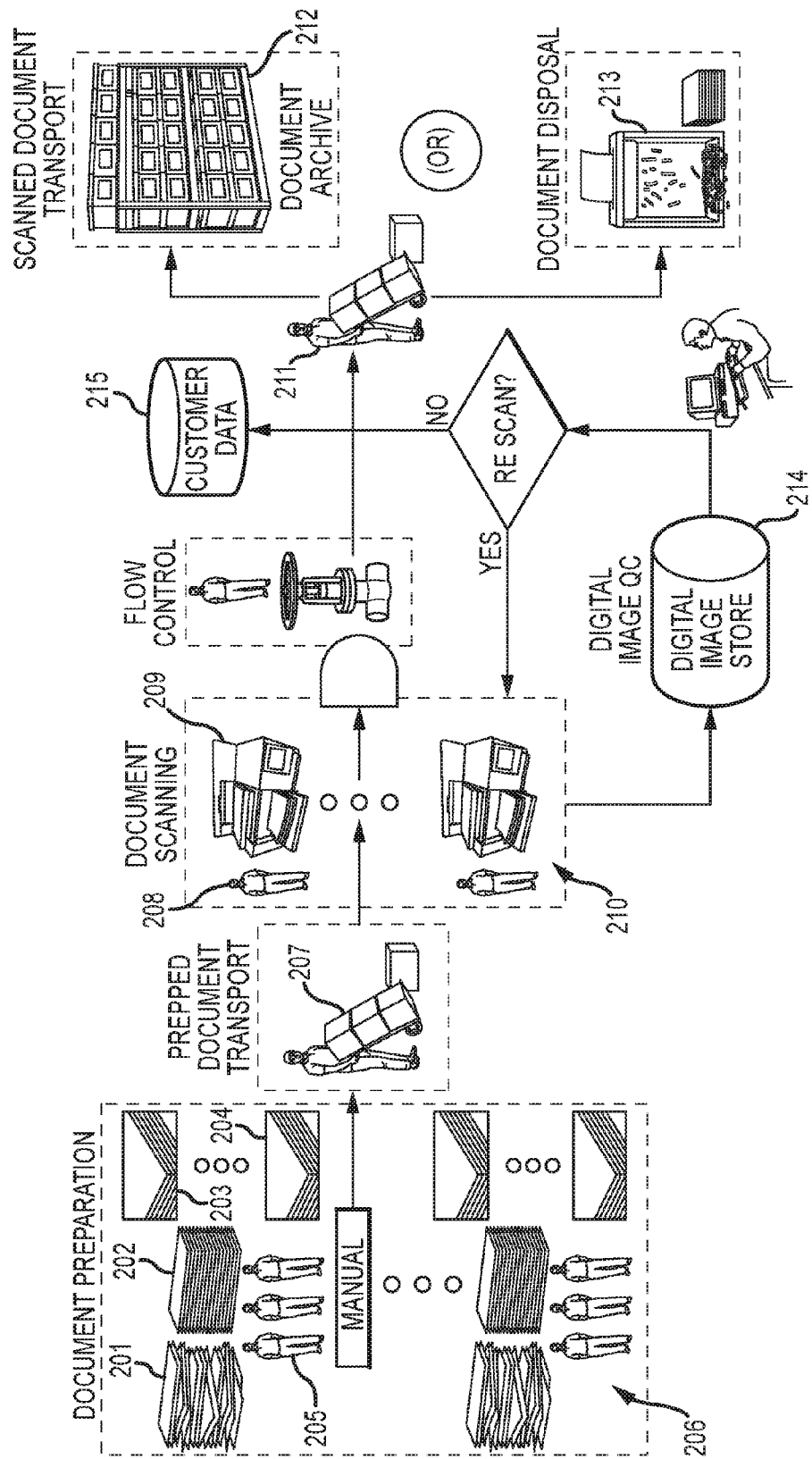
FIG. 2 is a diagram describing the operation of a prior art scanning operation using prior art scanners.
Figure 3A:
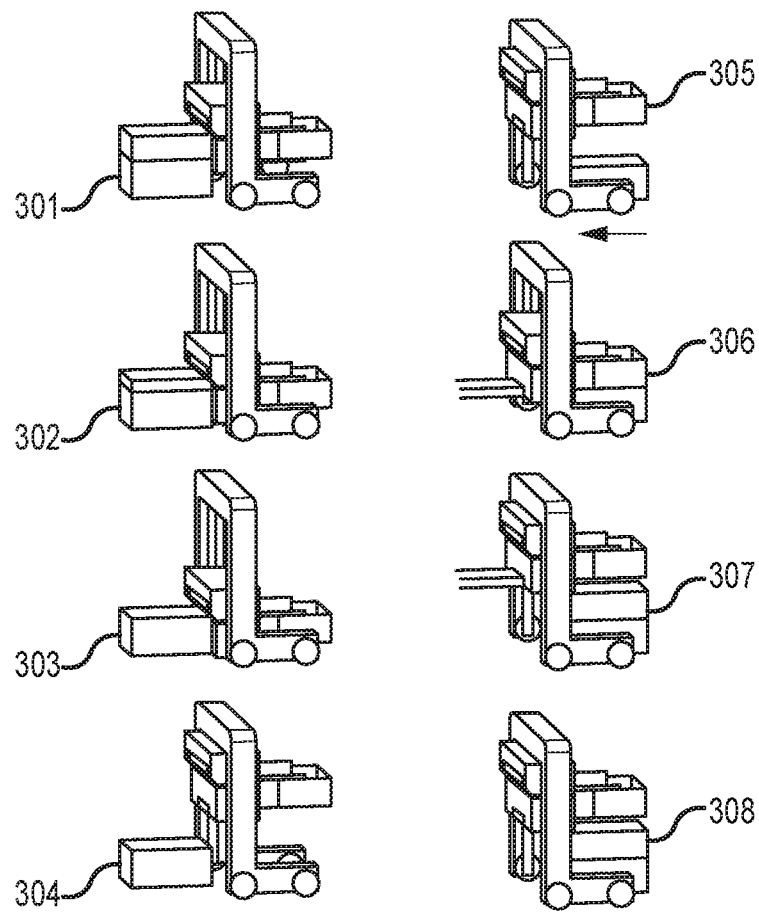
FIG. 3A is an illustration of a scanning sequence using and autonomous scalable scanner.

FIG. 3A illustrates a typical scanning sequence. In step 301, an autonomous scanner approaches a scanner-ready stack. In steps 302 and 303, the autonomous scanner scans a stack of documents, reducing the size of the scanner-ready stack as each sheet is scanned and placed in the autonomous scanner's output tray. In step 304, the Scan Engine is raised to the top of its travel. In step 305, the autonomous scanner moves forward the length of its output tray. In step 306, the output tray's elevator mechanism is lowered and the tray's floor is retracted, allowing the scanned documents to rest on the scanner-ready stack. In step 307, the elevator is raised, moving the output tray above the scanner-ready stack. In step 308, the output tray floor is homed and restored to act as the floor of the output tray.

Optionally, a customer may want scanned documents to retain their original order, for archival or other purposes. Because the sequence described in FIG. 3A results in documents being returned to the stack in reverse order, the scanner may support repeating the steps of FIG. 3A to return the stack to its original ordering.

Figure 3B:
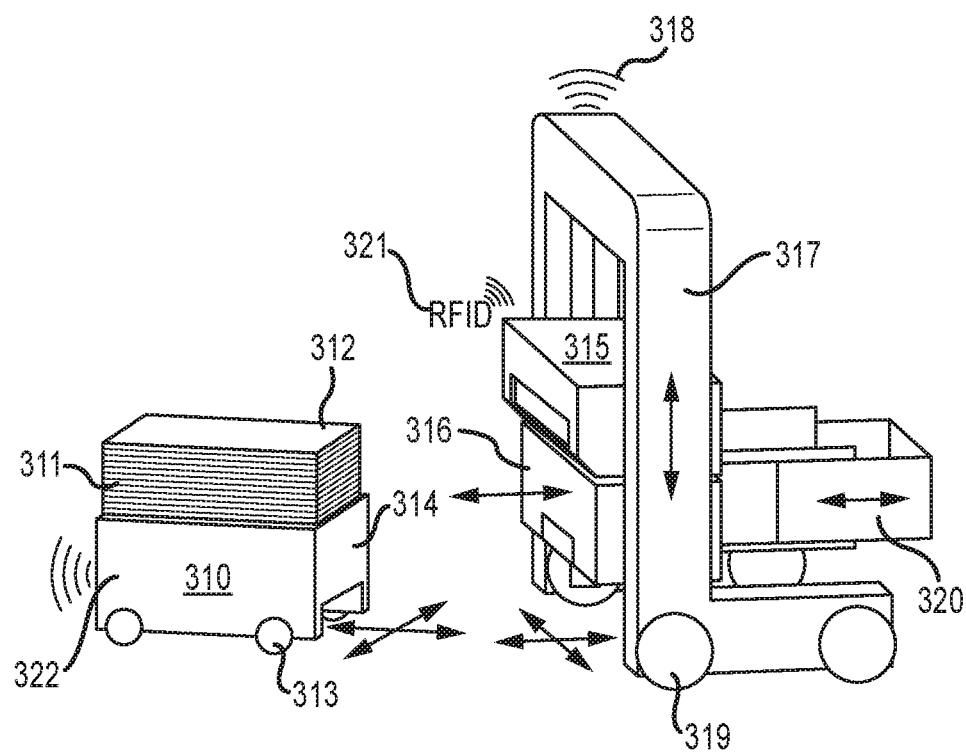
Figure 3B is a depiction of an autonomous scalable scanner and scanning pad.

FIG. 3B illustrates features of the autonomous scanner and scanner-ready stack. Support structure or "Pad" 310 is a support structure for supporting a scanner-ready stack 311. A support structure may have five sides, or other configurations may be used. Support structure 310 may house transmitters, an embedded controller, and locomotion means, which may be wheels, motors, and a power source. Sheet 312 is a sheet tagged with an RFID tag or other data storage device, such as a magnetic strip or barcode. Any number of sheets 312, including zero, can be included in a stack 311. Locomotion means 313 may be included, allowing support structure 310 to move in the X-Y plane of the floor or other surface on which it is supported. Signaling devices 314 modulate a signal representing the state of the supported scanner-ready stack 311. Such status may include "Un-scanned," "Scanned awaiting QC Result," "Re-scan," or "Scanned QC done." Antenna 322 allows scanner-ready stack 311 to communicate with central controller 415 or Scan Engine 315. This communication may be WiFi, Bluetooth, radio, or any other wireless communication.

Scan Engine 315 houses the transport motors, imagers, feed mechanism, and embedded controller. Scan Engine 315 supports the output tray walls, floor 316, floor motor, and elevator motor drive. Frame structure 317 provides support for the scan engine 315, and has a rack-in guide slot used by the Scan Engine 315's elevator drive motor pinion to position Scan Engine 315 vertically. Structure 317 also houses a power source, which may be a battery power source, and a charging circuit. Antenna 318 allows the embedded controller within Scan Engine 315 to communicate with the central controller 415 or other computing device. Structure 317 may house locomotion means 319, which may be motor wheels and a drive mechanism. The output tray length 320 is adjustable to accommodate the maximum document size to be scanned. Reader 321 allows Scan Engine 315 to scan sheets 312, and may be an RFID reader, magnetic strip reader, barcode scanner, or similar device.

Figure 4:
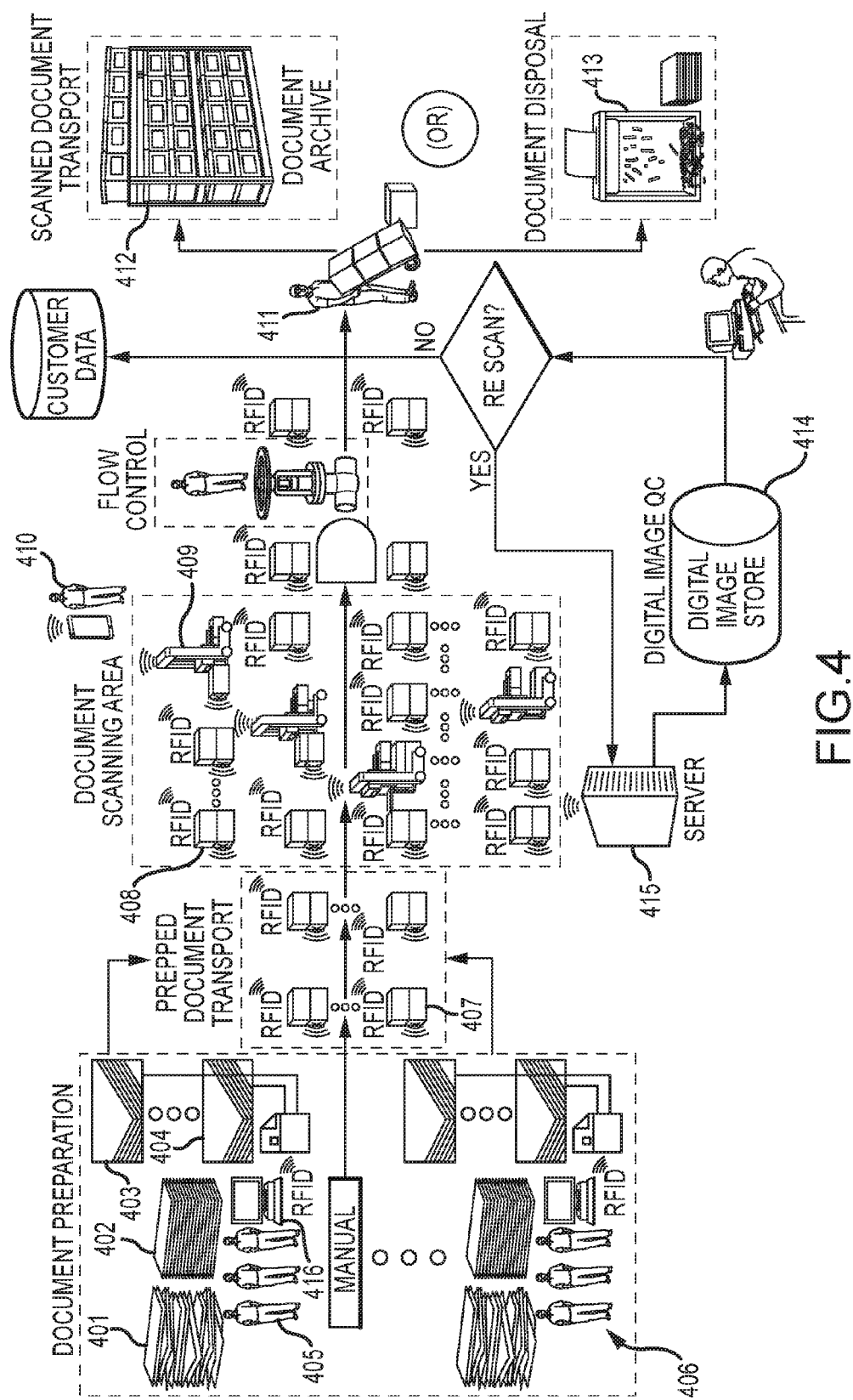
FIG. 4 is a diagram describing a scanning operation using autonomous scalable scanners and pads.

FIG. 4 illustrates a scanning operation using autonomous scanning devices. Unsorted documents 401 may be prepared for scanning. Human or other input 405 may be used to sort 402 document stacks into sorted document stacks 403-404 located on one or more scanning pads 407 and 408. A tagged sheet 416 may be placed on a stack. Scanning pads 407 and 408 may communicate with one or more Scan Engines 409 to indicate they are available for scanning. Scan Engine 409 may use a motor and wheels, or other means of locomotion, to move in proximity to pads 407 or 408 to enable documents to be scanned. Alternatively, scanning pad 407 or 408 may use a motor and wheels, or other means of locomotion, to move in proximity to a Scan Engine 409. A user may monitor this automated scanning process using a communication device 410 that may monitor the status of pads 407 and 408 and Scan Engines 409 over a network. Scan documents 411 may be moved using automated or manual processes to archive 412 or dispose 413 of the scanned documents. Scanned documents are stored on server 415. Manual operators 414 may, at any point after scanning, examine digital images of scanned documents to determine whether a rescan is necessary. If no rescan is necessary, the digital images may be stored as customer data.

The process depicted in FIG. 4 is centered on organizing documents in Scanner Ready stacks. The system and method may include a special sheet which would be added to the scanner ready stack. This special sheet is like any other individual page of a document, in that it is handled by the separation and transport mechanisms of the autonomous scanners like all other pages. However, these special, or tagged, sheets have an RF contactable static memory, such as an RFID tag, or may include a readable magnetic strip or barcode. As documents are prepared and configured into Scanner Ready Stacks, these special tagged sheets may be inserted by the operator to provide control information to the autonomous scanner and other computer systems managing the overall process. This information may include the parameters that tell the autonomous scanner how to capture the image from the documents that follow the tagged sheet until the next tagged sheet is read.

These parameters may include capture attributes like resolution, color, grayscale or black and white as well as other attributes like file format to generate, resultant file compression rate, and/or finished image file destination. The tagged sheet may also tell the central controller 415 if a batch of document pages which represent a contiguous record will span multiple scanner ready stacks and, if so, provide unique index information allowing the central controller to re-combine the digital images as a multipage digital document. This index information could be in the form of a unique document ID and sequential batch number. This is necessary as large documents which span many scanner ready stacks may be scanned by different autonomous Scan Engines out of sequence. Providing the index information allows the control logic of the individual autonomous scanners to be very simple. As previously mentioned, the information stored on the tagged sheet would also provide each autonomous scanner the destination location defining where the resultant image data is to be transmitted. This location could be a tuple of information like network name and directory share name. The data may be written as a file named uniquely by concatenating the unique document ID and the sequence number as read by the autonomous scanner from the tagged sheet. Data is then transmitted from Scan Engine 315 to central controller 415, either at scan time or at a later time.

If sheets 312 are equipped with RFID tags, the RFID reading process done by the autonomous scanner may be very near field such that the scanner's reading power would be set very low. RFID tags can be read from varying distances depending on the power strength the reader (in this case the autonomous scanners reader) employs to initiate the read. By using very low power, a reading system may be provided that requires the reader to be in near or direct contact with the RFID tag. This allows many RFID tags to be contained in the same scanner ready stack, and the parameter data by which the system is controlled can be changed mid batch. RFID tags may contain information in memory indicating what their order is on the scanner-ready stack. In addition, contact-type methods of providing information, such as scanned barcodes or magnetic strips, may ensure that only the topmost sheet 312 is read by reader 321.

Once the scanner ready stacks are built by Doc Prep personnel, they may be placed on a pad, table, or other surface. The pads may include wireless communication interfaces, internal computer memories and processors, and/or internal locomotion elements. Each pad may be a simple plastic molded box used to support a scanner ready stack. The pad may additionally include a battery operated circuit board that controls internal elements.

The pad 310 may be any supporting surface that elevates the paper stack 311 above floor level. The pad may have a top surface that supports any number of scanner ready stacks 311, and may be formed as a shelf. The pad may also be fixed, and may provide a connection to line power (unlimited source) as well as wired network connectivity. By having the pad provide line power and wired network connectivity, battery power of the autonomous scanner 315 would only be required to provide power to the motion controller and locomotion means 319. Once the autonomous scanner 315 comes in contact with a powered pad it will derive the higher power level required to transport and image the documents in the scanner ready stack from the power provided by the pad. Also, once in contact with the pad, the autonomous scanner's batteries can be charged. This will limit the requirements for excessive amounts of expensive power storage and allows the autonomous scanner to charge the power storage in parallel with scanning. The pad providing a wired network interface benefits the system from the point of view of lower power usage and allows the information gathered from the digitized documents to be transmitted more securely Elements controlled by a circuit board in the pads allow the autonomous scanners to locate pads with un-scanned documents, such as a signaling element. These may also derive power from the pads. Internal elements in the pads may further include a DC motor driven clamping mechanism to hold the scanner ready stacks in position as they are moved, and a wireless communication interface in communication with the central control computer. This wireless communication interface may allow the central control computer to control the state of the signaling element within the pad that is recognized by the autonomous scanners. Autonomous scanners may alternatively use other methods of detecting a pad, such as a CCD camera or wire guidance.

The signaling elements may include a transmitter located on the pad such that signals are transmitted by the pad and received by the autonomous scanner. These transmitters may include RF, IR, LED, or other electromagnetic signal transmitters. The transmitters may also be audio or acoustic transmitters. The transmitter signals may be received and read by corresponding receivers on the autonomous scanners. When using multiple pads, each transmitting signals within a work environment, the autonomous scanners may be programmed to filter received signals such that the strongest signal received is interpreted while weaker signals are ignored. The pattern of the strongest signal may be decoded by the autonomous scanner as it looks for a pad from which to scan documents. When a central controller, or internal programming within the autonomous scanners, has provided instructions on a preferred or required order in which to scan the stacks of documents, the scanner may alternatively search for signals from the various pads in order to complete the scanning in the preferred or required order.

In this instance, each pad may transmit a signal that includes at least an identification of that pad. The signals may further include information regarding the types of documents on the pad, whether the documents on the pad are related to documents on any other stack in the room, the preferred output destination for the scanned images of the documents in the stack, and the ordering of the stack in relation to other stacks to be scanned. The pad may also signal the central controller when it detects it has entered the scanning area. This detection may be done by detecting unique floor features, such as coloring or a taped outline, or may be done by calculating the pad's position based on its movements. Upon receiving any signal from a pad, the central controller may signal the pad to cease transmission until the pad has changed its state (for example, from the "Un-scanned" to the "Scanned Awaiting QC Result" state), preventing the pad from continuously transmitting a signal already acknowledged as received by the central controller.

The transmitters on the pads may be located on all vertical faces of each pad, allowing an autonomous scanner approaching it to detect it from any direction. The face from which the autonomous scanner is to approach the pad that has the scanner ready stacks lead edge aligned, and from which it is intended to scan, may have additional information in the modulated signal to indicate that it is the side from which the autonomous scanner should approach the stack. Alternatively, the transmitters may also be located on a particular face or location, thus ensuring that the autonomous scanner reading the transmitted signal is approaching the stack from the correct orientation and position to scan the stack. The transmitted signals may further include information indicating that the stack is ready to be scanned, that a second scan is requested for ordering or quality control reasons, or that the stack has already been scanned and is awaiting removal from the room. Providing this information in the transmitted signals helps to ensure that the same stack is not scanned multiple times, unless this is a desired part of the scanning process. The transmitted signals from the pads allow an autonomous scanner to use simple logic interpreting the data encoded in the modulated transmitted signals, along with intensity of the received signals, to approach each pad from the correct direction and square itself to the correct pad face to begin scanning. The transmitted signals can further provide information to help ensure that the document stacks are scanned in a preferred order, or that the information from each scanned stack is transmitted in an appropriate order to a central controller, or locally stored in an appropriate order.

The pads could have a mechanical device that lightly clamps the scanner ready stack to the top surface of the pad such that moderate outside forces experienced as the pads are transported from the document preparation area to the scanner area do not dislodge the papers within the stack. This locking mechanism could be controlled by the autonomous scanner signaling the pad to release the stack as it approaches the pad in preparation to scan the documents. This clamp could be a simple mechanism that applies a downward force on the top surface of the scanner ready stack at the centerline of the lead edge of the stack, with the force being applied by a motor driven pinion gear driving a rod up and down with a perpendicular arm that engages the stack. This clamping mechanism can be engaged and disengaged.

In one configuration of the system, a pad loaded with a scanner-ready stack and the clamp force applied could be moved manually by hand truck from a document preparation area to a scanner area. This allows the pads to be very low cost and simple. It may be positioned and aligned with a Scan Engine and left until an autonomous scanner scans the documents on it and the Quality Control ("QC") operation is complete. The Quality Control operation 414 may involve an operator examining each digital image of each scanned page, and requesting a rescan if the image is considered inadequate, for example due to low contrast, missing data, or other similar reasons. In another configuration of the system, the pads could themselves be mobile and move autonomously by locomotion means from the document preparation area to the scanning area.

In this configuration, a pad may approach the next available scanner. Using pads with locomotion mechanisms, the movement of the scanner may be limited to simply de elevate and scan then move forward and set the scanned stack back on the pad. The pad with scanned documents would leave the scanner and the next pad with un-scanned documents would move into scanning position in front of the scanner. The use of transmitters and receivers previously described to position the scanners and pads relative to each other would be reversed to allow the pads to detect a scanner to approach, along with the proper orientation and scanner side to approach.

In another implementation where the pads do not have locomotion elements, the autonomous scanners could be used to move pads with un-scanned documents from document preperation to the scanning area, and to move scanned and QC'd documents from the scanning area to the scanned document waiting for disposal or archive area. Each pad may include a slot opening in the bottom, into which the scanner can extend its output tray movable bottom. This allows the autonomous scanner to act as forklift-like device and move and position the pads.

After the scanner ready stacks are positioned on pads which are either manually positioned in the scanner area or moved to the scanner area autonomously by their own locomotion means and control, the documents on the pads will be scanned by the next available autonomous scanner, as described above. The Scanned documents may be returned to the pad from which they were scanned. Alternatively, other pads or predetermined locations may be provided for scanned documents. In this instance, the autonomous scanners may transport scanned pages to these designated pads or areas. Scanned documents on their original pad may wait for QC verification. If a QC operator 414 detects errors in a scanned image, QC operator 414 may request a rescan. After a rescan is requested, the central scanner control server may send a signal to the pad containing the scanned documents for rescan.

Upon receipt of that signal, the pad may modulate its transmitter to indicate to the next available scanner that the documents need to be re scanned. The re-scan signal may be different than the "ready to scan" signal, such that the next available scan engine would know to rescan the documents. In order to perform he rescan, the scanner may transport the documents without imaging to put them back in original order, place them back on the pad, and reposition for the actual scan pass. Alternatively, a rescan can be performed without putting the documents back into the original order. After the rescan, the central controller would properly order the images of the documents in the digital domain by just reversing the order of the images. Once the images are rescanned and transmitted to the central controller server successfully, the central controller server may signal that pad to change the modulation of its signaling transmitters to a "scan complete" state or turn the transmitter signal off so that no additional scanning would be attempted by an available autonomous scan engine. Again, the scanned documents on the pad would wait for the QC operation to complete.

Once the scanned documents on a pad have passed QC, the central control server may send a pad with scanned documents whose digitized images have passed QC validation a signal to modulate it's transmitters to indicate a Validated Scan Complete state. Any pad in the validated scanned complete state would move or be moved by one of the autonomous or manual processes previously described to the area where documents await archival or destruction disposition. At this point the process of scanning is complete. The resultant data may continue to be manipulated in other business related processes.

In addition to having a set of scanned documents wait on the pad for QC validation, other asynchronous processing of the digitized document images can be done in the server. This processing may include characterizing or classifying the documents based on varying features of the data found on the page, the format of the data on the page, or the size or aspect ratio of the paper sheet on which the digitized information was imaged. This classification may result in various commands being sent to an autonomous scanner from the server. This may include complex sorting of the original documents. For example from the classification step all the documents which were banking checks could be sorted out of the scanned stack by multiple scan (with or without imaging) and stack deposition moves. This would allow a user to remove the document above a document he wants to sort out by scanning that number of sheets and depositing them on an empty pad for this purpose. Then the autonomous scanner would return to the scanned stack which now has the document the classification processing has indicated needs to be sorted form the original scanner ready stack at the top of the stack. This document can be scanned and deposited on a pad where the stack of sorted documents of this class will be built. This process can be repeated for many documents and classes. The final disposition of the sorted documents may be as simple as reshuffling the stack to the original order as previously described or as complex as out sorting special classes of document based on attributes which indicate they are special and need to saved or reprocessed.

The system may also include a method for autonomous scanners to communicate with each other to avoid race conditions where multiple autonomous scanners would try to scan the same un-scanned batch. Avoiding the race condition may be done by providing a digital lock flag or mutex that the central control server maintains for each un-scanned pad. An autonomous scanner that detects a pad with an un-scanned batch would attempt to acquire the lock for that pad. If it acquires the lock, it would move toward that pad and process the batch as previously described. If it cannot attain the lock, it would assume another scan engine will scan that batch and it would progress to locate another un-scanned batch.

The autonomous scanners may avoid other objects as they move to in an effort to locate un-scanned documents. These other objects to be avoided include the human operator or other life forms that enter the scanning area as well as other autonomous scanners. To perform this avoidance of objects, the autonomous scanners may include one or more sensors, such as vision sensors, infrared sensors, and radar sensors. These sensors used in combination and controlled by the correct logic allow the autonomous scanners to avoid objects other than the pads which they expect in their environment.

Figure 5:
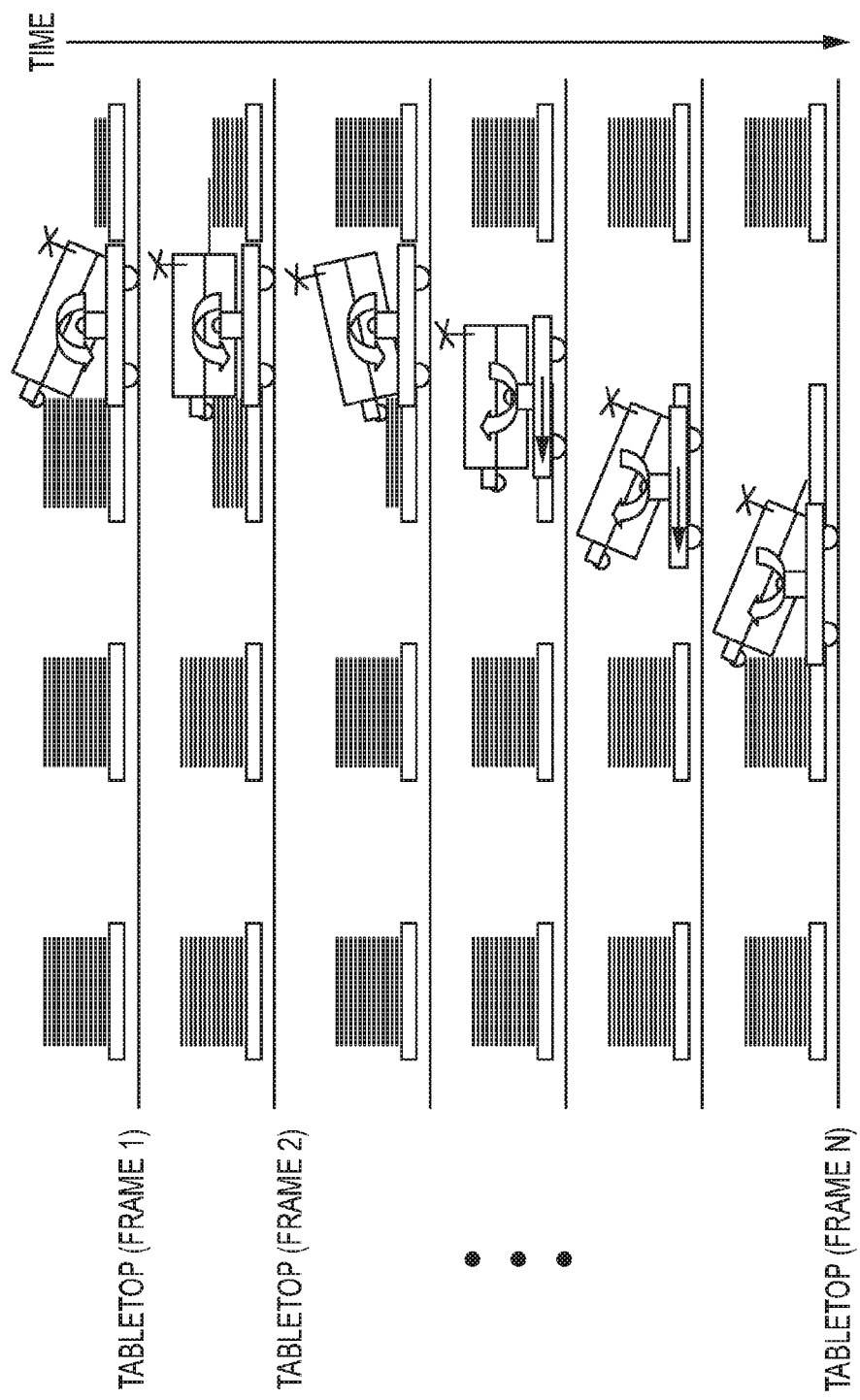
FIG. 5 is a diagram depicting an embodiment of an autonomous scanner with scanning pads located on a tabletop.

FIG. 5 depicts an embodiment of the invention describing a Scan Engine located on a table comprising one or more document stacks on pads. FIG. 5 shows an iterative process where the Scan Engine scans a document stack located on a pad, stores scanned documents on an output stack, and then repeats the process with another document stack located on a second pad.

The Scan Engines may be scaled to create varying levels of scanning capacity without redesigning and building new scanners every time an efficiency improvement is required. Efficiency is improved by simply applying more Scan Engines, or running the autonomous scanners for a longer period of time (such as overnight).

Figure 6:
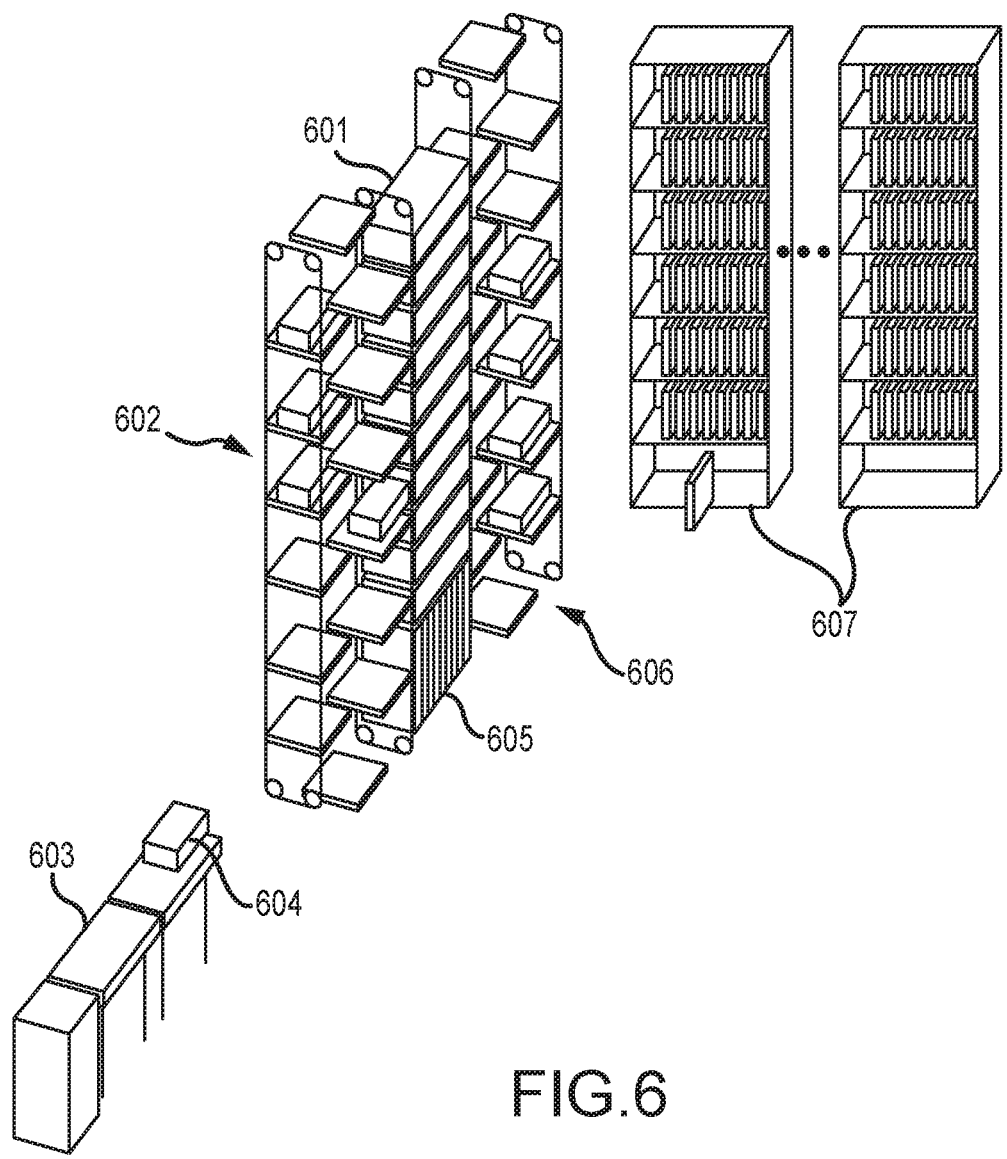
FIG. 6 is a diagram depicting an embodiment of an autonomous scanner using batch box input.

Scaling relatively slow scanners to produce high productivity may also be provided using a system as shown in FIG. 6. As shown, this involves vertically stacked scan engines fed by recirculating conveyors at an input and output. One or more automated batch box loaders 603 may be associated with a stack of one or more Scan Engines 601. These batch box loaders load one or more documents into one or more batch boxes 604. A batch box loader 603 may detect and remove staples from a document, characterize a document in terms of shape, size, color content, thumbnail, presence of a barcode, or other document features. A batch box 604, once loaded, may have static memory associated with the box which stores the characteristics of the document or documents loaded inside the batch box. After batch box loader 603 loads batch box 604, one or more input devices, which may be horizontal or vertical conveyors, may be configured to move 602 a full batch box containing unscanned documents to the next available Scan Engine 601 in the stack. Once an input device moves the full batch box to the selected Scan Engine 601, the Scan Engine may then read the static memory stored in batch box 604. The Scan Engine 601 may then scan the document or documents stored within batch box 604 per the parameters received from static memory. The Scan Engine 601 may transmit scan data to one or more blade processors 605 for further data processing. One or more output devices 606, which may be horizontal or vertical conveyors, may move an empty batch box and engage it to a Scan Engine 601's output mechanism. A Scan Engine 601 may be configured to not scan a document until both a full batch box is located in its input and an empty batch box is located in its output. Scan Engine 601 may place scanned documents in the empty batch box. The Output device 606 may then be configured to relocate the batch box with scanned documents to long term storage or archiving in storage racks 607, or may relocate the batch box with scanned documents to a location for recycling or destruction.

Scanner-ready stacks may be bound with a special clamping mechanism, and a mechanical device of the scan engine could pull the next scanner ready stack off the input conveyor for scanning. The output may be done in reverse and the scanned stack would be pushed to the output conveyor. Scan engine input boxes containing documents may be conveyed to an available Scan Engine and engaged by the Scan Engine's Input Mechanism, and empty Output Boxes may also be conveyed to a Scan Engine and engaged by the Scan Engine's Output Mechanism. The Scan Engine may then scan the documents, transferring them from the input box to the output box in the process. After scanning, the full Output box may be conveyed to archival storage. The empty input box may be used to load additional documents to be scanned, or may be used as an output box for a future scan.

A Scan Engine may also be configured to connect to an infeed shelving nest and outfeed shelving nest storage unit. The Scan Engine may scan from any infeed shelf nest and deposit the scanned documents in any outfeed shelf nest. The infeed, Scan Engine and outfeed systems may be placed, one next to the other, as layers to scale the operation, such that an outfeed system may serve as an infeed system to a second Scan Engine. Doc preparation personnel may load their scanner ready stacks into an initial layer of infeed shelves. A Scan Engine may then scan the documents and place them onto a second layer outfeed shelving units. These outfeed shelving units serve as input units for a second Scan Engine. This second Scan Engine may scan documents into a third layer of shelves, which serve as outfeed shelving for the second Scan Engine and may serve as infeed shelving for a third Scan Engine. This layering may occur for as many iterations as needed to scan and sort documents. Layering in this manner allows for data driven sorting of documents imaged by previous layers after the data from the images from the previous layers' scan operation are processed by the server.

Figure 7:
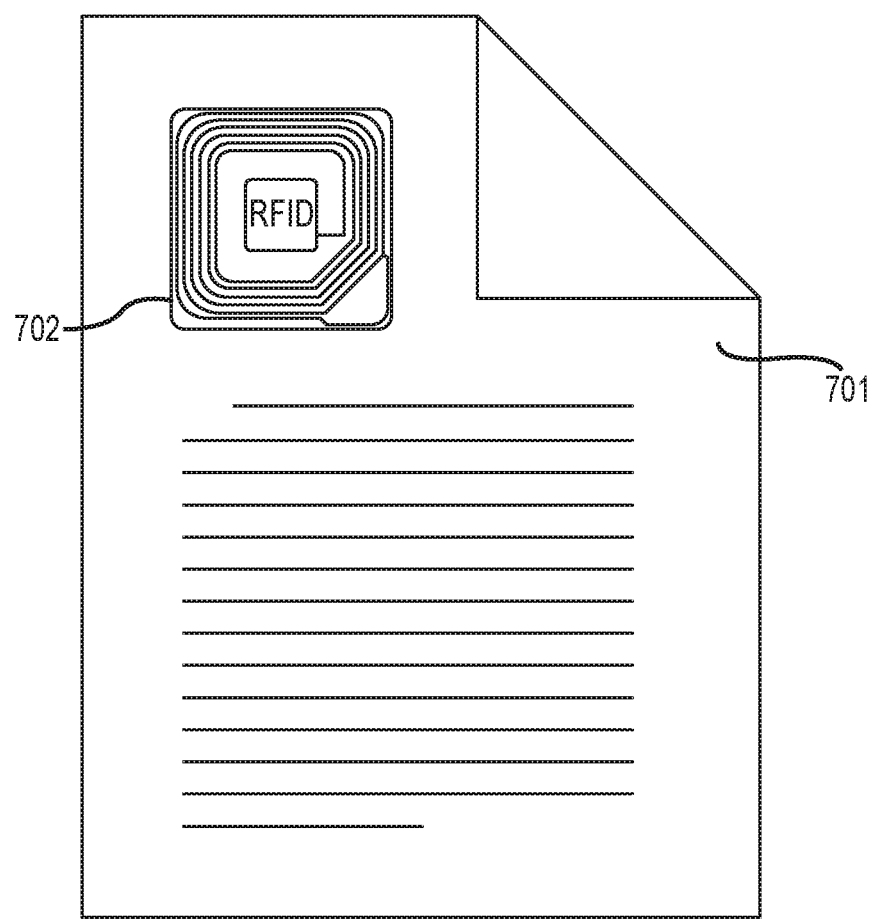
FIG. 7 is a diagram depicting a tagged sheet.

The features of special tagged sheets 312, mentioned above, are illustrated in FIG. 7. Transportable document page 701 is a sheet of paper, with RFID tag, barcode, or magnetic strip 702 adhered to it. The special tagged sheets 312 may include batch and sequence tuple of information, representing a unique ID and location mechanism. If the special tagged sheet 312 is left in the batch, and allows for contactless reading of data, a special reader with varying discrimination power output capability could be used to locate the batches for later recovery. In a room with large numbers of archived batches this scanning discriminator could be used to locate the batch precisely and quickly This discrimination method allows a user of such a scanner to enter the unique batch sequence number ID and the scanner leads the user physically to the batch of paper that contains the tagged sheet. If the tagged sheet uses, for example, a long-range RFID tag, it can be read at a range of 20 to 30 feet under ideal conditions.

The invention claimed is:

1. A mobile autonomous scalable scanner system, comprising:
 a first conveyor including a plurality of scanning boxes, each including at least one paper sheet and wherein at least one scanning box includes static memory; and
 a second conveyor including a plurality of scan engines, each including a document scanner comprising an imager;
 the first conveyor configured to move at least one of the plurality of scanning boxes towards the second conveyor;
 the second conveyor configured to move at least one of the plurality of scan engines to a height of at least one of the paper sheets on at least one scanning box; and
 the document scanner configured to operate the imager to create a digital image of the one of the at least one paper sheets.

2. The scanner system of claim 1, wherein the static memory stores one or more characteristics of a document.

3. The scanner system of claim 2, wherein the one or more characteristics stored includes at least one of shape, size, color content, thumbnail, or presence of a barcode.

4. The scanner system of claim 1, further comprising a batch box loader, wherein the batch box loader is configured to place one or more paper sheets within at least one of the plurality of scanning boxes.

5. The scanner system of claim 1, further comprising an output device;
 wherein at least one scan engine further comprises an output mechanism; and
 wherein the output device is configured to engage at least one empty scanning box with the output mechanism.

6. The scanner system of claim 5, wherein the output device is configured to move scanning boxes from the output mechanism to one or more storage racks.

7. The scanner system of claim 1, wherein one of the at least one paper sheets includes control information for the document scanner.

8. The scanner system of claim 7, wherein the at least one sheet comprising control information includes at least one of an RFID tag, magnetic strip, or barcode, and wherein the scan engine comprises an RFID reader, magnetic strip reader, or barcode reader.

9. The scanner system of claim 1, wherein at least one scan engine is configured to transmit scan data to one or more processors.

10. A method for autonomously scanning a document, comprising:
 providing a first conveyor including a plurality of scanning boxes, each including at least one paper sheet and wherein at least one scanning box includes static memory;
 providing a second conveyor including a plurality of scan engines, each including a document scanner comprising an imager;
 operating the first conveyor to move at least one of the plurality of scanning boxes towards the second conveyor;
 operating the second conveyor to move at least one of the plurality of scan engines to a height of at least one of the paper sheets on at least one scanning box; and
 operating the imager to create a digital image of the one of the at least one paper sheets.

11. The method of claim 10, wherein the static memory stores one or more characteristics of a document.

12. The method of claim 11, wherein the one or more characteristics stored includes at least one of shape, size, color content, thumbnail, or presence of a barcode.

13. The method of claim 10, further comprising providing a batch box loader; and further comprising operating the batch box loader to place one or more paper sheets within at least one of the plurality of scanning boxes.

14. The method of claim 10, wherein at least one scan engine further comprises an output mechanism, and further comprising:
 providing an output device; and
 operating the output device to engage at least one empty scanning box with the output mechanism.

15. The method of claim 14, further comprising operating the output device to move scanning boxes from the output mechanism to one or more storage racks.

16. The method of claim 10, further comprising configuring the document scanner using control information stored on one of the at least one paper sheets.

17. The method of claim 16, wherein the at least one sheet comprising control information includes at least one of an RFID tag, magnetic strip, or barcode, and wherein the scan engine includes an RFID reader, magnetic strip reader, or barcode reader.

18. The method of claim 10, further comprising operating at least one scan engine to transmit scan data to one or more processors.

* * * * *